(12) United States Patent
Suffern et al.

(10) Patent No.: US 8,359,646 B2
(45) Date of Patent: Jan. 22, 2013

(54) ENSURING SECURITY OF CONNECTION BETWEEN THIN CLIENT AND CLIENT BLADE

(75) Inventors: Edward Stanley Suffern, Chapel Hill, NC (US); James J. Bozek, Bothell, WA (US)

(73) Assignee: International Business Machines Corporation, Armonk, NY (US)

( * ) Notice: Subject to any disclaimer, the term of this patent is extended or adjusted under 35 U.S.C. 154(b) by 1593 days.

(21) Appl. No.: 11/776,930

(22) Filed: Jul. 12, 2007

(65) Prior Publication Data

US 2009/0019544 A1 Jan. 15, 2009

(51) Int. Cl.
*G06F 11/00* (2006.01)

(52) U.S. Cl. .......... 726/22; 713/168; 713/300; 709/223; 709/224; 714/3; 714/4.11; 714/22; 714/100

(58) Field of Classification Search .................. 713/168, 713/300; 726/22; 714/100, 22, 3–4, 4.1; 1/168, 300; 709/223, 224
See application file for complete search history.

(56) References Cited

U.S. PATENT DOCUMENTS

| | | | | |
|---|---|---|---|---|
| 5,689,689 A * | 11/1997 | Meyers et al. | ............... | 713/375 |
| 6,360,269 B1 * | 3/2002 | Mamros et al. | ............... | 709/228 |
| 6,678,835 B1 * | 1/2004 | Shah et al. | ............... | 714/4 |
| 6,721,502 B1 | 4/2004 | Al-Salameh et al. | ............... | 398/3 |
| 6,775,703 B1 * | 8/2004 | Burns et al. | ............... | 709/228 |
| 6,928,394 B2 * | 8/2005 | Bauchot et al. | ............... | 702/188 |
| 6,976,071 B1 | 12/2005 | Donzis et al. | ............... | 709/224 |
| 7,035,214 B1 * | 4/2006 | Seddigh et al. | ............... | 370/231 |
| 7,065,660 B2 * | 6/2006 | Sanchez | ............... | 713/300 |
| 7,152,111 B2 | 12/2006 | Allred et al. | ............... | 709/227 |
| 7,340,532 B2 * | 3/2008 | Swildens | ............... | 709/238 |
| 7,765,286 B2 * | 7/2010 | Mark | ............... | 709/223 |
| 7,779,282 B2 * | 8/2010 | Ramachandran et al. | ..... | 713/323 |
| 7,937,617 B1 * | 5/2011 | Nagineni et al. | ............... | 714/13 |
| 7,965,703 B2 * | 6/2011 | Rieger | ............... | 370/352 |
| 2003/0012129 A1 | 1/2003 | Lee et al. | ............... | 370/216 |
| 2005/0060557 A1 | 3/2005 | Lin | ............... | 713/188 |
| 2007/0073891 A1 * | 3/2007 | Foltan et al. | ............... | 709/230 |
| 2007/0130481 A1 * | 6/2007 | Takahashi et al. | ............... | 713/300 |
| 2008/0130560 A1 * | 6/2008 | Khandekar et al. | ............... | 370/329 |
| 2008/0162956 A1 * | 7/2008 | Bozek et al. | ............... | 713/310 |

FOREIGN PATENT DOCUMENTS

| EP | 0 999 673 A2 | 5/2000 |
|---|---|---|
| WO | WO 2004/021652 A2 | 3/2004 |

OTHER PUBLICATIONS

International Search Report and Written Opinion for International Application No. PCT/EP2008/058362 dated Apr. 12, 2008.

* cited by examiner

*Primary Examiner* — Yin-Chen Shaw
(74) *Attorney, Agent, or Firm* — Robert A. Voigt, Jr.; Winstead, P.C.

(57) ABSTRACT

A method and system for ensuring security and preventing intrusion in a connection between a thin client and a client blade. An encrypted keep-alive protocol is conducted between the client blade and the thin client. The client blade issues keep-alive protocol messages and monitors for keep-alive protocol acknowledgments from the thin client. If a failure in receiving a keep-alive protocol acknowledgment from the thin client is detected and the failure is not due to a momentary glitch in the keep-alive protocol, then a command is generated to enter the client blade in a particular state (e.g., a hard power off state). The command is based on a "privilege mask" which includes code that specifies an action to be performed (i.e., enter a particular state) by the client blade. Based on the action performed by the client blade, the client blade provides different levels of security or protection against intrusion.

20 Claims, 6 Drawing Sheets

ENSURING SECURITY OF CONNECTION BETWEEN THIN CLIENT AND CLIENT BLADE

TECHNICAL FIELD

The present invention relates to the field of security in a remote desktop environment, and more particularly to ensuring security of the connection between thin clients and client blades.

BACKGROUND INFORMATION

In a remote desktop environment, a computer, referred to herein as a "thin client," is connected to a server, referred to herein as a "client blade," via a network (e.g., local area network, wide area network). A "thin client" may refer to a user's computer that performs no application processing. The thin client functions like an input/output terminal, processing only keyboard and mouse input and screen output, and all application processing is performed on a server, such as a client blade. A "client blade" may refer to a typical server that does not include a storage unit (e.g., hard disk drive, floppy disk drive). Typically, a group of client blades are housed in one location, which may be referred to as a "BladeCenter™." Each client blade in the BladeCenter™ may plug into a single cabinet or individual port card that adds connectivity to a switch which is used for switching control to a particular client blade. Out of the group of client blades in the BladeCenter™, one or more of them may be designated for servicing particular information (e.g., human resource information, financial data, engineering data).

Once a user of a thin client is connected to a designated client blade to service particular information, the connection may later be compromised by an intruder. There are many types of attacks or intrusions (e.g., Internet Protocol (IP) spoofing, denial of service attacks, denial of service spoofing, SYN flooding) to break the connection between the user of the thin client and the designated client blade. Once the connection between the user of the thin client and the designated client blade is broken, the intruder may essentially act as the user of the thin client thereby maintaining a connection between the client blade and the intruder. The intruder may then have the opportunity to access information that may be personal, such as financial information.

The following are some examples of different types of attacks or intrusions. These are not meant to be exhaustive. One example of an attack involves someone "sniffing" or "snooping" the data traffic within a network. Even though the data payload may be encrypted, the Transmission Control Protocol/Internet Protocol (TCP/IP) headers and routing information are not. Using the snooping technique, the intruder can determine the unique Media Access Control (MAC) physical address and couple it to the user's assigned IP address. Once the targeted MAC and IP addresses are known, the intruder can then send a message to the unsuspecting user and have the TCP/IP protocol route the return packet to the intruder. This method of intrusion is known as "IP spoofing." The intruder spoofs the connection thereby later breaking the current connection and is therefore able to access the targeted client blade.

Another type of attack is called a denial of service spoof. In this scenario, a user types in the name of a domain, such as computerlanguage.com. The network converts the domain name into an IP address. Since each network routing point contains cached entries in a routing table, an intruder may be able to obtain the domain name/IP relationship from this table once the connection has been made. The denial of service attack intruder spoofs the response to the request and sends the response directly to the intruder rather than the user requesting the information. Once this information is obtained, an Ethernet packet is sent to that user and the response is redirected or "spoofed" to the intruder.

Yet another method of network attack that allows an intruder access to an unsuspecting user is a source routing option for Ethernet TCP/IP traffic. When a message is broadcast to a number of users, the response traffic is routed to a specific user using a certain path. The intruder then has access and a connection to that endpoint because the intruder is able to determine the network route.

These attacks or intrusions break the connection to the end user of the thin client and the end user is unable to communicate or contact the client blade. If the client blade is left connected with the intruder, theft or some malicious attack on the client blade may occur as discussed above. If, however, the intrusion was detected, then appropriate actions may be enacted to thwart the theft or a malicious attack.

Therefore, there is a need in the art for detecting an intrusion in the connection between the end user of the thin client and the client blade and taking appropriate actions thereby ensuring, at least in part, the security of the connection.

SUMMARY

The problems outlined above may at least in part be solved in some embodiments by conducting a keep-alive protocol between the client blade and the thin client. The client blade may issue keep-alive protocol messages and monitor for keep-alive protocol acknowledgments from the thin client. If a failure in receiving a keep-alive protocol acknowledgment from the thin client is detected and the failure is not due to a momentary glitch in the keep-alive protocol, then a command is generated to enter the client blade in a particular state (e.g., a hibernation state, a sleep state, a shutdown state and a hard power off state) thereby disconnecting the client blade from the network and intruder. The action is based on a "privilege mask" which is stored in the client blade. The privilege mask includes code that specifies an action to be performed (i.e., enter a particular state) by the client blade upon detecting a failure in the connection between the thin client and the client blade. Based on the action performed by the client blade (e.g., enter a hard power off state), the client blade provides different levels of security or protection against intrusion (e.g., eliminating, at least in part, having an intruder access personal information stored on the client blade; eliminating, at least in part, having an intruder install a virus on the client blade).

In one embodiment of the present invention, a method for ensuring security in a connection between a thin client and a client blade comprises the step of conducting a keep-alive protocol with the thin client, where the keep-alive protocol comprises keep-alive protocol messages initiated by the client blade and keep-alive protocol acknowledgments initiated by the thin client. The method further comprises monitoring the keep-alive protocol acknowledgments from the thin client. The method additionally comprises detecting a failure in receiving a keep-alive protocol acknowledgment from the thin client. The method further comprises generating a command upon detecting the failure, where the command is determined based on a privilege mask, where the privilege mask comprises a code that specifies an action to be performed by the client blade upon detecting the failure. The method additionally comprises determining a particular state the client blade is to enter based on the command. Further, the method comprises entering the particular state.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and system for ensuring security in a connection between a thin client and a client blade. In one embodiment of the present invention, a keep-alive protocol is conducted between the client blade and the thin client. The client blade may issue keep-alive protocol messages and monitor for keep-alive protocol acknowledgments from the thin client. If a failure in receiving a keep-alive protocol acknowledgment from the thin client is detected and the failure is not due to a momentary glitch in the keep-alive protocol, then a command is generated to enter the client blade in a particular state (e.g., a hibernation state, a sleep state, a shutdown state and a hard power off state). The command is based on a "privilege mask" which is stored in the client blade. The privilege mask includes code that specifies an action to be performed (i.e., enter a particular state) by the client blade upon detecting a failure in the connection between the thin client and the client blade. Based on the action performed by the client blade (e.g., enter a hard power off state), the client blade provides different levels of security or protection against intrusion (e.g., eliminating, at least in part, having an intruder access personal information stored on the client blade; eliminating, at least in part, having an intruder install a virus on the client blade).

While the Background Information section discusses attacks to obtain a connection to the client blade, the principles of the present invention may also be applied to attacks that are not a direct attempt to obtain a connection to the client blade, such as a denial of service SYN attack. For example, the keep-alive acknowledgments may be slow from the thin client thereby triggering an indication that an attack, such as a denial of service SYN attack, may be occurring. The appropriate action to handle such an attack is as described herein. It is noted that a person of ordinary skill in the art would be capable of applying the principles of the present invention to such attacks. Further, embodiments covering such attacks would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
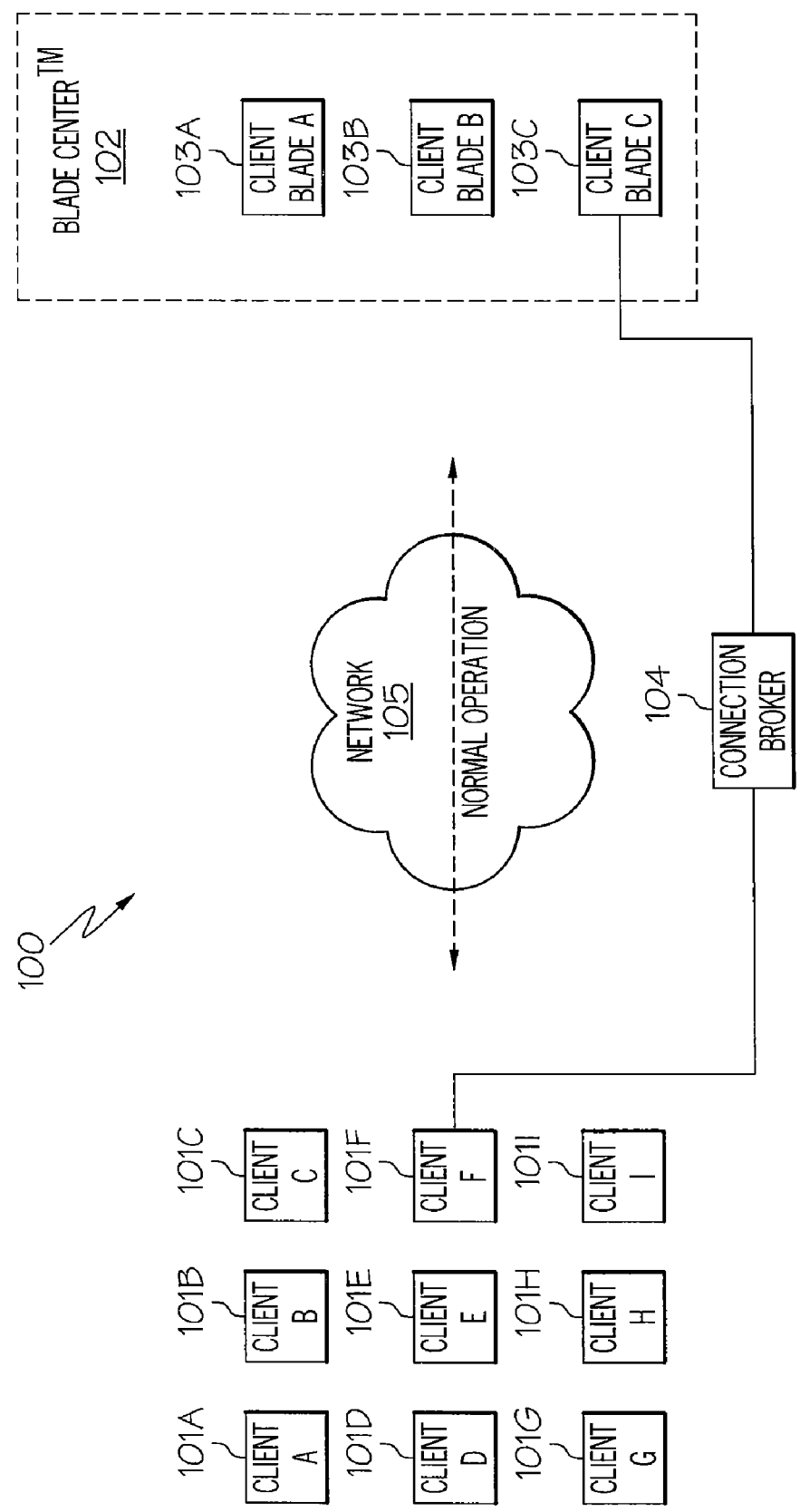
FIG. 1 illustrates a network system for a remote desktop environment in accordance with an embodiment of the present invention.

FIG. 1—Network System for Remote Desktop Environment

FIG. 1 illustrates an embodiment of a network system 100 for a remote desktop environment in accordance with the present invention. Network system 100 may include multiple thin clients 101A-I (designated as "client A . . . client I" in FIG. 1). Thin clients 101A-I may collectively or individually be referred to as thin clients 101 or thin client 101, respectively. Each thin client 101 functions like an input/output terminal, processing only keyboard and mouse input and screen output, and all application processing is performed on a server, such as a client blade (discussed further below). A more detail description of thin client 101 is provided further below in association with FIG. 2.

Network system 100 may further include a BladeCenter™ 102 housing multiple client blades 103A-C (designated as "client blade 103A . . . client blade 103C" in FIG. 1). Client blades 103A-C may collectively or individually be referred to as thin client blades 103 or client blade 103, respectively. Client blades 103 may refer to a typical server that does not include a storage unit (e.g., hard disk drive, floppy disk drive). Each client blade 103 in BladeCenter™ 102 may plug into a single cabinet or individual port card (not shown) that adds connectivity to a switch (not shown) which is used for switching control to a particular client blade 103. Out of the group of client blades 103 in BladeCenter™ 102, one or more of them may be designated for servicing particular information (e.g., human resource information, financial data, engineering data). A more detail description of thin client blade 103 is provided further below in association with FIG. 3.

Network systems 100 may further include a connection broker 104. Connection broker 104 is configured to establish a connection between thin client 101 and a particular client blade 103. Each client blade 103 sends a message to connection broker 104 to register themselves and their service capabilities (e.g., service human resource information, service engineering data, service financial data). Upon receiving a log-on request from a user of thin client 101, connection broker 104 connects thin client 101 to the appropriate client blade 103 based on its service capabilities.

Once the connection between thin client 101 and client blade 103 is established, thin client 101 and client blade 103 communicate with one another via a network 105. Network 105 may refer to a Local Area Network (LAN) (e.g., Ethernet, Token Ring, ARCnet), or a Wide Area Network (WAN) (e.g., Internet). Thin client 101 and client blade 103 communicate over network 105 during "normal operation."

Network system 100 may include any number of thin clients 101 as well as any number of client blades 103 in BladeCenter™ 102. Network system 100 depicted in FIG. 1 is illustrative and is not to be limited in scope to any one particular embodiment.

As discussed above, thin client 101 functions like an input/output terminal in one embodiment, processing only keyboard and mouse input and displaying screen output, and all application processing is performed on client blade 103. A more detail discussion of thin client 101 is provided below.

FIG. 2—Thin Client

Figure 2:
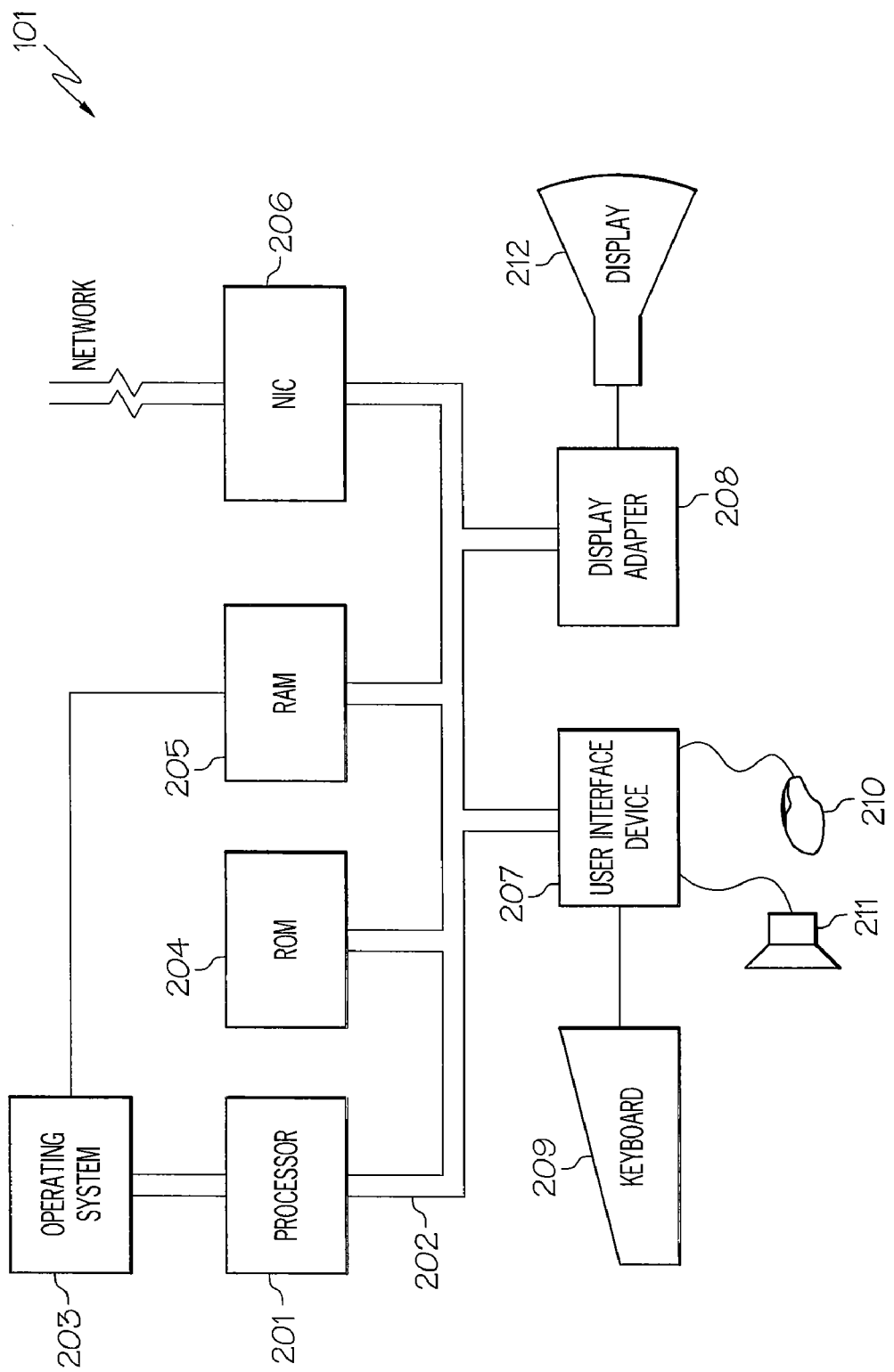
FIG. 2 illustrates a hardware configuration of a thin client in accordance with an embodiment of the present invention.

FIG. 2 illustrates an embodiment of a hardware configuration of thin client 101 (FIG. 1) which is representative of a hardware environment for practicing the present invention. Thin client 101 may have a processor 201 coupled to various other components by system bus 202. An operating system 203 may run on processor 201 and provide control and coordinate the functions of the various components of FIG. 2. It is noted that thin client 101 may not have an operating system and that FIG. 2 is illustrative.

Referring to FIG. 2, Read-Only Memory (ROM) 204 may be coupled to system bus 202 and include a basic input/output system ("BIOS") that controls certain basic functions of thin client 101. Random access memory (RAM) 205 may also be coupled to system bus 202. RAM 205 may include a program for generating keep-alive protocol acknowledgements in response to receiving keep-alive protocol messages as well as for detecting the failure in receiving a keep-alive protocol message as discussed further below in association with FIGS. 4A-C. The program may further be configured to notify connection broker 104 (FIG. 1) of the failure in receiving a keep-alive protocol message. The program further be configured to post an error message of a lost connection as well as return to the login screen as discussed further below in association with FIGS. 4A-C. The program may be loaded into RAM 205 by connection broker 104 upon connection broker 104 establishing the connection between thin client 101 and client blade 103 (FIG. 1). It should be noted that software components including operating system 203 may be loaded into RAM 205, which may be thin client's 101 main memory for execution.

Referring to FIG. 2, thin client 101 may further include a network interface card 206 coupled to bus 202. Network interface card 206 may interconnect bus 202 with an outside network (e.g., network 105 of FIG. 1) enabling thin client 101 to communicate with client blade 103 and connection broker 104.

I/O devices may also be connected to thin client 101 via a user interface adapter 207 and a display adapter 208. Keyboard 209, mouse 210 and speaker 211 may all be interconnected to bus 202 through user interface adapter 207. Further, Universal Serial Bus (USB) devices (not shown) may also be connected to bus 202. Data may be inputted to thin client 101 through any of these devices. A display monitor 212 may be connected to system bus 202 by display adapter 208. In this manner, a user is capable of inputting to thin client 101 through keyboard 209 or mouse 210 and receiving output from thin client 101 via display 212 or speaker 211.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

As discussed above, client blade 103 services particular information (e.g., human resource information, financial data, engineering data) for the connected thin client 101. A more detail discussion of client blade 103 is provided below.

Figure 3:
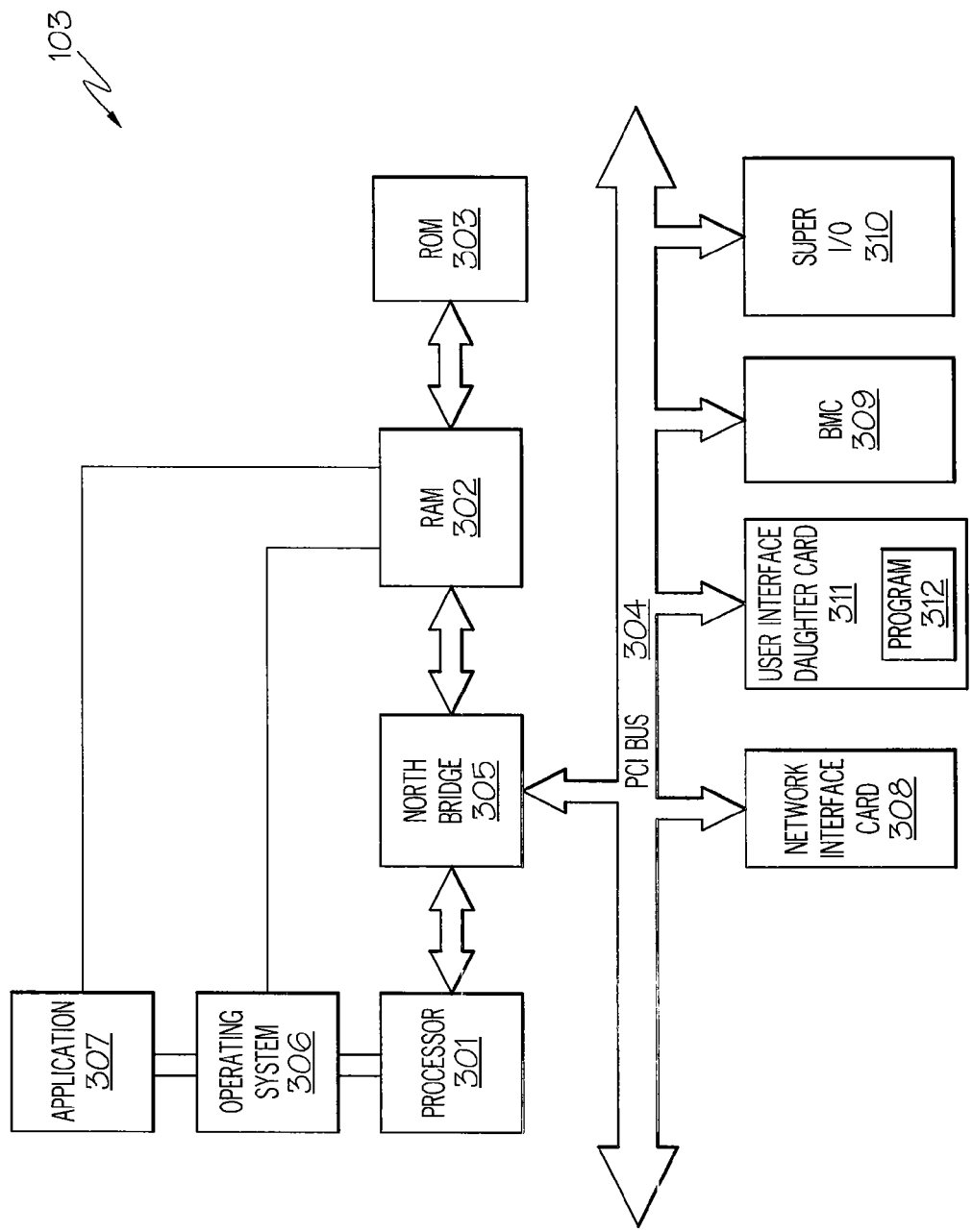
FIG. 3 illustrates a hardware configuration of a client blade in accordance with an embodiment of the present invention.

FIG. 3—Client Blade

FIG. 3 illustrates a typical hardware configuration of client blade 103 (FIG. 1) which is representative of a hardware environment for practicing the present invention. Client blade 103 may employ a peripheral component interconnect (PCI) local bus architecture. Although the depicted example employs a PCI bus, other bus architectures such as Accelerated Graphics Port (AGP) and Industry Standard Architecture (ISA) may be used.

Referring to FIG. 3, client blade 103 includes a processor 301. Client blade 103 further includes a random access memory 302 (e.g., Dynamic Random Access Memory (DRAM), Synchronous DRAM (SDRAM)), and a read only memory 303 which may all be connected to processor 301 through north bridge 305. North bridge 305 may also include an integrated memory controller and cache memory for processor 301. Furthermore, an operating system 306 may run on processor 301 to provide control and coordinate the functions of the various components of FIG. 3. An application 307 in accordance with the principles of the present invention may run in conjunction with operating system 306 and provide calls to operating system 306 where the calls implement the various functions or services to be performed by application 307. Application 307 of client blade 103 may include, for example, a program for registering client blade 103 with connection broker 104 (FIG. 1) as discussed below in association with FIGS. 4A-C. It should be noted that software components including operating system 306 and application 307 may be loaded into client blade's 103 main memory 302.

In one embodiment, north bridge 305 is coupled to a Peripheral Component Interconnect (PCI) bus 304. Additional components coupled to PCI bus 304 may be made through direct component interconnection or through add-in boards. In the depicted example, network interface card 308, baseboard management controller 309 (designated as "BMC" in FIG. 3) and "super input/output chip" 310 (designated as "Super I/O" in FIG. 3) are connected to PCI local bus 304 by direct component connection. Network interface card 308 provides a connection to the external network (e.g., network 105 of FIG. 1) for operating system 306. In contrast, user interface daughter card 311 is connected to PCI local bus 304 by an add-in board inserted into an expansion slot. User interface daughter card 311 may also contain a network connection to the external network (e.g., network 105 of FIG. 1) and connection broker 104. This network connection enables client blade 103 to communicate with other devices, such as thin client 101 (FIG. 1) or connection broker 104.

Baseboard management controller 309 may be configured to generate a command (e.g., a pulse of a particular duration) upon the detection of a failure of the connection between client blade 103 and thin client 101. A failure of the connection, as discussed herein, refers to user interface daughter card 311 not receiving a keep-alive protocol acknowledgment from thin client 101 which was not attributed to a momentary glitch in the keep-alive protocol, as discussed further below in connection with FIGS. 4A-C. The command generated by baseboard management controller 309 is determined based on a privilege mask, where the privilege mask includes code that specifies an action to be performed by client blade 103 upon the detection of the failure of the connection between client blade 103 and thin client 101. In one embodiment, the privilege mask is set-up in baseboard management controller 309 by connection broker 104 when connection broker 104 established the connection between thin client 101 and client blade 103. A more detail discussion of a privilege mask as well as baseboard management controller 308 generating a command upon the detection of a failure of the connection between client blade 103 and thin client 101 is provided further below in association with FIGS. 4A-C.

Super input/output chip 310 may be configured to control operating system 306 and the power states of client blade 103. In one embodiment, super input/output chip 310 receives the command generated from baseboard management controller 309 in connection with the detection of the failure of the connection between client blade 103 and thin client 101. In one embodiment, the command is a pulse where the duration of the pulse is correlated with a particular state client blade 103 is to enter thereby preventing, at least in part, an intrusion and ensuring security for the connection between thin client 101 and client blade 103. For example, a pulse of less than one second may correspond to a sleep state. A pulse of greater than one second but less than four seconds may correspond to a hibernate state. A pulse of greater than four seconds may correspond to a shutdown state. If, however, the privilege mask indicates for client blade 103 to enter a state referred to herein as a "hard power off" state when there is a failure in the connection between client blade 103 and thin client 101, then baseboard management controller 309 issues a request, instead of generating a pulse, to super input/output chip 310 to immediately cut power to client blade 103 except for providing standby power to baseboard management controller 309. These different states provides different levels of security. A sleep or hibernate state allows the user of thin client 101 to immediately log-in to connection broker 104 and have connection broker 104 re-establish the connection to the same client blade 103 if there is deemed not to be a security problem. In the soft shutdown state, data is saved when client blade 103 is shut-off; however, more time is required to return client blade 103 to its operating state. In the hard power off state, client blade 103 is immediately turned off and no data is saved. In this state, no virus should be able to be installed on client blade 103.

As discussed above, user interface daughter card 311 is connected to PCI local bus 304 by an add-in board inserted into an expansion slot. User interface daughter card 311 may include a program 312 used for conducting a keep-alive protocol between client blade 103 and thin client 101. The keep-alive protocol involves program 312 generating keep-alive protocol messages, which are encrypted according to an algorithm established by connection broker 104 at the time of connecting client blade 103 with thin client 101, that are to be received by a program in thin client 301. The program in thin client 301, as discussed above in connection with thin client 301, decrypts the keep-alive protocol message and generates a keep-alive acknowledgement in encrypted form, where the decryption/encryption is according to an algorithm established by connection broker 104 at the time of connecting client blade 103 with thin client 101.

Program 312 of user interface daughter card 311 is further configured to monitor the keep-alive protocol acknowledgements from thin client 101. When program 312 of user interface daughter card 311 detects a failure in receiving a keep-alive protocol acknowledgement from thin client 101, program 312 determines if the failure in receiving a keep-alive protocol acknowledgement was due to a momentary glitch in the protocol. If program 312 can re-establish the keep-alive protocol with thin client 101 using a retry mechanism (e.g., continuous attempt to re-establish the keep-alive protocol with thin client 101 for a certain period of time), then the failure was due to a momentary glitch in the protocol. If, however, program 312 cannot re-establish the keep-alive protocol with thin client 101 using a retry mechanism, then a failure of the connection is detected. For example, if program 312 cannot re-establish the keep-alive protocol with thin client 101 over a certain period of time, as indicated by a timer (implemented in either hardware or software in user interface daughter card 311), then a failure in the connection (i.e., a break in the connection) is detected. Program 312 of user interface daughter card 311 may then inform connection broker 104 of the failure. It is noted that program 312 in user interface daughter card 311 is stored in a memory (not shown) and executed by a processing unit (not shown) in user interface daughter card 311. In this manner, there is not a burden on operating system 306 to perform this function.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

A method for ensuring security in the connection between thin client 101 and client blade 103 is discussed below in connection with FIGS. 4A-C.

Figure 4A:
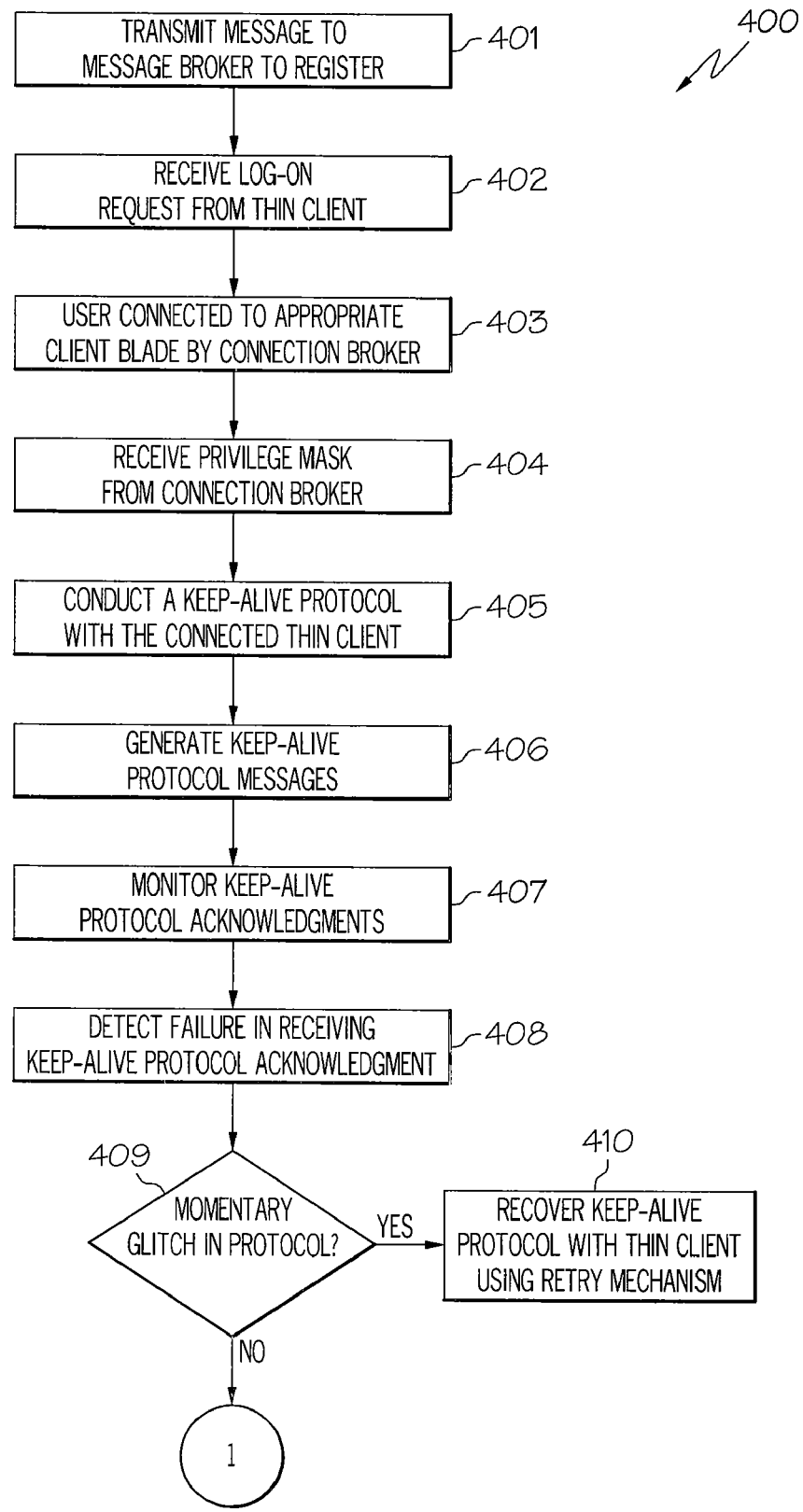
FIGS. 4A-C are a flowchart of a method for ensuring security in the connection between the thin client and the client blade in accordance with an embodiment of the present invention.
Figure 4B:
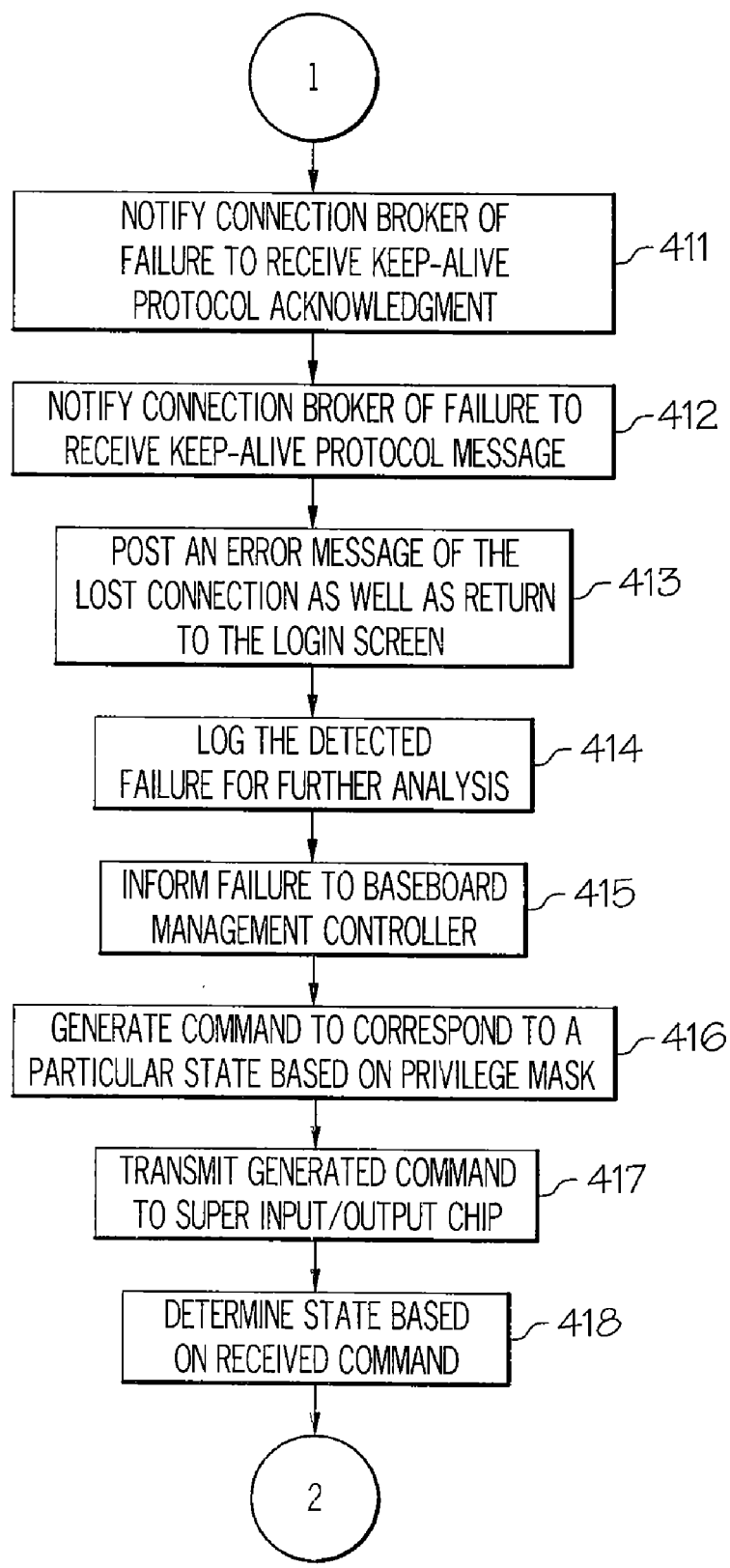
Figure 4C:
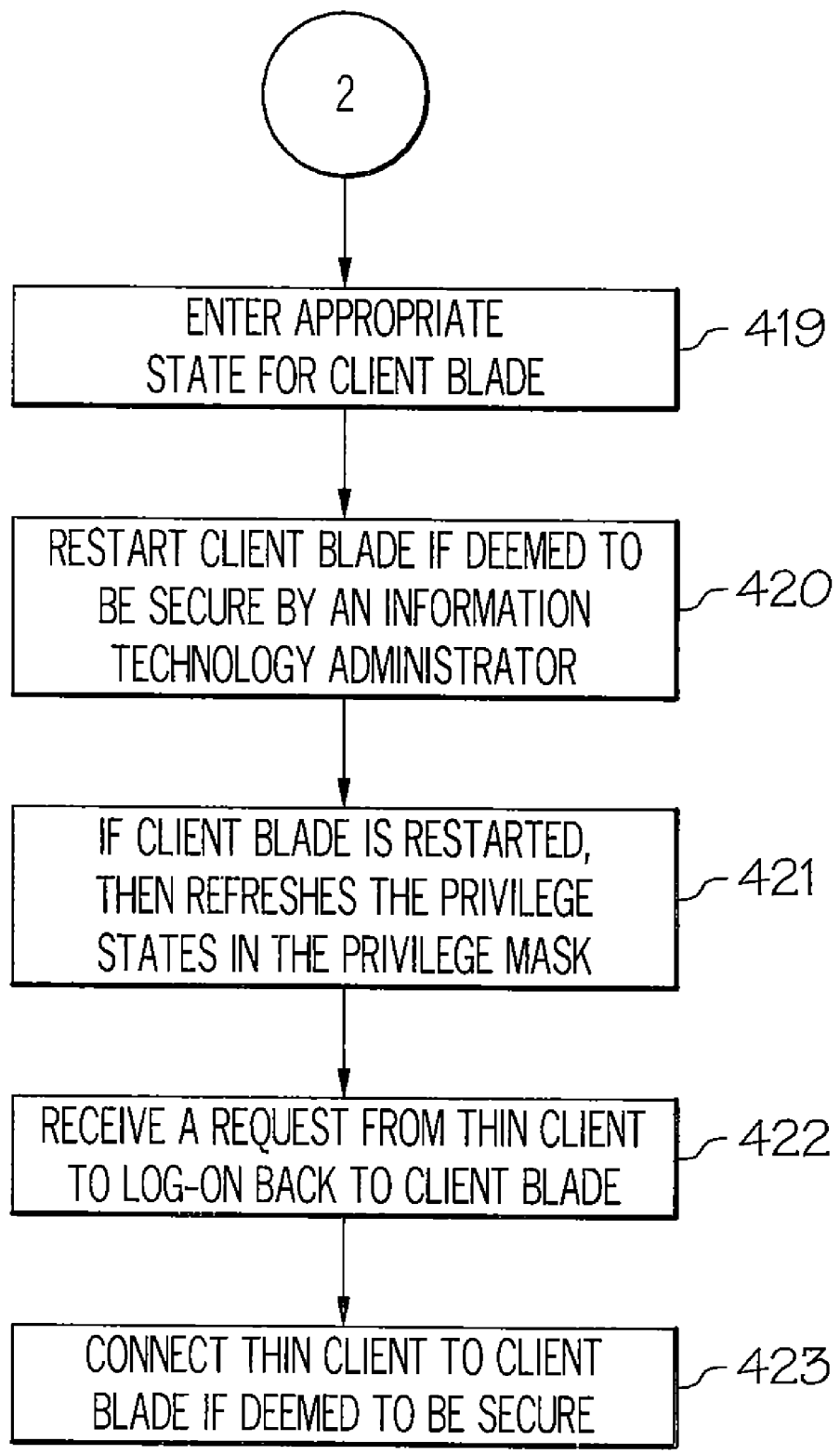

FIGS. 4A-C—Method for Ensuring Security in the Connection Between Thin Client and Client Blade FIGS. 4A-C are a method 400 for ensuring the security in the connection between thin client 101 (FIGS. 1 and 2) and client blade 103 (FIGS. 1 and 3) in accordance with an embodiment of the present invention.

Referring to FIG. 4A, in conjunction with FIGS. 1-3, in step 401, client blade 103 transmits a message to connection broker 104 to register itself, where the message includes informing connection broker 104 of its service capabilities (e.g., service human resource information, service engineering data, service financial data).

In step 402, connection broker 104 receives a log-on request from thin client 101. Upon receiving a log-on request from a user of thin client 101, connection broker 104, in step 403, connects thin client 101 to the appropriate client blade 103 based on its service capabilities.

In step 404, client blade 103 receives a "privilege mask" from connection broker 104 at the time of establishing the connection between client blade 103 and thin client 101. The "privilege mask" is set up by an information technology administrator where the privilege mask includes code that specifies an action to be performed by client blade 103 upon the detection of the failure of the connection between client blade 103 and thin client 101. In one embodiment, the privilege mask is set-up in user interface daughter card 311 of client blade 103 by connection broker 104 when connection broker 104 establishes the connection between thin client 101 and client blade 103.

In step 405, user interface daughter card 311 of client blade 103 conducts a keep-alive protocol with the connected thin client 101. The keep-alive protocol involves user interface daughter card 311 generating keep-alive protocol messages and thin client 101 generating keep-alive protocol acknowledgments in response to receiving these messages. These messages and acknowledgments are encrypted and decrypted based on encryption and decryption techniques set by connection broker 104 at the connection time, or, alternatively, can be a default. Furthermore, the timing of these keep-alive protocol messages and acknowledgments is set by connection broker 104 at the connection time, or, alternatively, can be a default.

In step 406, user interface daughter card 311 of client blade 103 generates keep-alive protocol messages. In step 407, user interface daughter card 311 of client blade 103 monitors for keep-alive protocol acknowledgements.

In step 408, user interface daughter card 311 of client blade 103 detects a failure in receiving a keep-alive protocol acknowledgment. In step 409, user interface daughter card 311 of client blade 103 determines whether this failure in receiving a keep-alive protocol acknowledgment is a momentary glitch in the keep-alive protocol or if the failure is due to a break in the connection. In one embodiment, user interface daughter card 311 of client blade 103 continuously attempts to re-establish the keep-alive protocol with thin client 101 for a certain period of time. The process of continuously attempting to re-establish the keep-alive protocol with thin client 101 for a certain period of time is referred to herein as the "retry mechanism."

If user interface daughter card 311 of client blade 103 is able to re-establish a connection with thin client 101, then, in step 410, the keep-alive protocol is recovered using the retry mechanism referred to above.

Referring to FIG. 4B, if, however, the keep-alive protocol has not been re-established with thin client 101 once the period of time expires, such as indicated by a timer (implemented in either hardware or software in user interface daughter card 311), then the failure is due to a break in the connection. The break in the connection may be caused by an intruder as described above. The break in the connection may also be caused by a break in the network. In either case, the resultant action is the same. As a result, in step 411, user interface daughter card 311 of client blade 103 notifies connection broker 104 of the failure in receiving a keep-alive protocol acknowledgment (i.e., notifies connection broker 104 of a failure in the connection between client blade 103 and thin client 101).

In step 412, thin client 101 detects a broken connection by not receiving a keep-alive protocol message at the appropriate time and notifies connection broker 104 of the failure in receiving a keep-alive protocol message.

In step 413, thin client 101 posts an error message of the lost connection as well as returns to the login screen.

In step 414, connection broker 104 logs the detected failure for further analysis. For example, an information technology administrator may determine which client blades 103 have had its connections possibly tampered based on a summary log of all of the detected failures over a period of time.

In step 415, user interface daughter card 311 of client blade 103 (which is notified of the detected failure by connection broker 104) informs baseboard management controller 309 of client blade 103 of the detected failure. In step 416, baseboard management controller 309 of client blade 103 generates a command to enter client blade 103 in a particular state upon the notification of the detected failure. The command may be a pulse of a particular duration or may simply be a request to enter a particular state (e.g., "hard power off" state). The particular command generated by baseboard management controller 309 (i.e., action to take) is based on a privilege mask as discussed above. In step 417, baseboard management controller 309 of client blade 103 transmits the generated command to super input/output chip 310 of client blade 103 to perform the appropriate action.

In step 418, super input/output chip 310 of client blade 103 determines the state client blade 103 is to enter based on the received command. By receiving a command to enter client blade 103 in a particular state, an intrusion may be averted and security may be maintained for the connection between thin client 101 and client blade 103. For example, if the received command was a pulse of a particular duration, then as discussed above, the duration of the pulse is correlated with a particular state client blade 103 is to enter. For instance, a pulse of less than one second may correspond to a sleep state. A pulse of greater than one second but less than four seconds may correspond to a hibernate state. A pulse of greater than four seconds may correspond to a shutdown state. If, however, the privilege mask indicates for client blade 103 to enter a state, referred to as a "hard power off" state, when there is a failure in the connection between client blade 103 and thin client 101, then baseboard management controller 309 issues a request, instead of generating a pulse, to super input/output chip 310 to cut power to client blade 103 except for providing standby power to baseboard management controller 309. These different states provide different levels of security. A sleep or hibernate state allows the user of thin client 101 to immediately log-in to connection broker 104 and have connection broker 104 re-establish the connection to the same client blade 103 if there is deemed not to be a security problem. In the shutdown state, data is saved when client blade 103 is shut-off; however, more time is required to return client blade 103 to its operating state. In the hard power off state, client blade 103 is immediately turned off and no data is saved. In this state, no virus should be able to be installed on client blade 103.

Referring to FIG. 4C, in step 419, super input/output chip enters client blade 103 in the appropriate state.

In step 420, client blade 103 is restarted if deemed to be secure by an information technology administrator. In step 421, if client blade 103 is restarted, then information technology administrator refreshes the privilege states in the privilege mask. That is, the information technology administrator may establish a new state for client blade 103 to enter upon the detection of a subsequent failure in the connection between client blade 103 and thin client 101. The information technology administrator may provide a higher level of security because of the first intrusion detected. In step 422, connection broker 104 receives a request from thin client 101 to log-on back to client blade 103. In step 423, connection broker connects thin client 101 to client blade 103 if deemed to be secure.

Method 400 may include other and/or additional steps that, for clarity, are not depicted. Further, method 400 may be executed in a different order presented and that the order presented in the discussion of FIGS. 4A-C is illustrative. Additionally, certain steps in method 400 may be executed in a substantially simultaneous manner or may be omitted.

Although the method and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:
1. A method for ensuring security in a connection between a thin client and a client blade comprising the steps of:
   conducting a keep-alive protocol with said thin client, wherein said keep-alive protocol comprises keep-alive protocol messages initiated by said client blade and keep-alive protocol acknowledgments initiated by said thin client;
   monitoring said keep-alive protocol acknowledgments from said thin client;

detecting a failure in receiving a keep-alive protocol acknowledgment from said thin client where said failure is not attributed to a momentary glitch in said keep-alive protocol;

generating a command upon detecting said failure, wherein said command is determined based on a privilege mask, wherein said privilege mask comprises code that specifies an action to be performed by said client blade upon detecting said failure;

determining a particular state said client blade is to enter based on said command; and entering said particular state.

2. The method as recited in claim 1, wherein said command comprises a pulse of a particular duration, wherein said particular state said client blade is to enter is based on said particular duration of said pulse.

3. The method as recited in claim 1, wherein said command comprises a request to enter said particular state said client blade is to enter.

4. The method as recited in claim 1 further comprising the step of:

setting up said privilege mask in said client blade at a time of establishing said connection between said thin client and said client blade.

5. The method as recited in claim 1 further comprising the step of:

transmitting a message to a message broker to register said client blade, wherein said message comprises information regarding service capabilities of said client blade.

6. The method as recited in claim 5 further comprising the step of:

establishing a connection between said thin client and said client blade based on service capabilities of said client blade.

7. The method as recited in claim 1 further comprising the step of:

notifying a connection broker of said detected failure in receiving said keep-alive protocol acknowledgment from said thin client.

8. The method as recited in claim 7 further comprising the step of:

logging said detected failure for further analysis.

9. The method as recited in claim 1, wherein said particular state said client blade is to enter comprises one of the following: a hibernate state, a sleep state, a shutdown state and a hard power off state.

10. A system, comprising:

a client blade configured to service particular information, wherein said client blade comprises:

a processor;

a bus;

a user interface daughter card coupled to said processor via said bus, wherein said user interface daughter card comprises a computer program for ensuring security in a connection between a thin client and said client blade, wherein said computer program comprises the programming steps of:

conducting a keep-alive protocol with said thin client, wherein said keep-alive protocol comprises keep-alive protocol messages initiated by said client blade and keep-alive protocol acknowledgments initiated by said thin client;

monitoring said keep-alive protocol acknowledgments from said thin client; and detecting a failure in receiving a keep-alive protocol acknowledgment from said thin client where said failure is not attributed to a momentary glitch in said keep-alive protocol; and a controller connected to said user interface daughter card via said bus, wherein said controller is informed of said detected failure in receiving said keep-alive protocol acknowledgement from said user interface daughter card, wherein said controller generates a command upon detecting said failure, wherein said command is determined based on a privilege mask, wherein said privilege mask comprises code that specifies an action to be performed by said client blade upon detecting said failure; and a chip coupled to said controller via said bus, wherein said chip receives said generated command from said controller, wherein said chip determines a particular state said client blade is to enter based on said command, wherein said chip causes said client blade to enter said particular state.

11. The system as recited in claim 10, wherein said command comprises a pulse of a particular duration, wherein said particular state said client blade is to enter is based on said particular duration of said pulse.

12. The system as recited in claim 10, wherein said command comprises a request to enter said particular state said client blade is to enter.

13. The system as recited in claim 10 further comprises:

a connection broker coupled to said client blade, wherein said connection broker sets up said privilege mask in said controller when said connection broker establishes said connection between said thin client and said client blade.

14. The system as recited in claim 10 further comprises:

a connection broker coupled to said client blade, wherein said connection broker is configured to receive a message from said client blade to register said client blade, wherein said message comprises information regarding service capabilities of said client blade.

15. The system as recited in claim 14, wherein said connection broker is further configured to establish a connection between said thin client and said client blade based on service capabilities of said client blade.

16. The system as recited in claim 15, wherein said computer program of said user interface daughter card further comprises the programming step of:

notifying said connection broker of said detected failure in receiving said keep-alive protocol acknowledgment from said thin client.

17. The system as recited in claim 16, wherein said connection broker is further configured to log said detected failure for further analysis.

18. The system as recited in claim 10, wherein said particular state said client blade is to enter comprises one of the following: a hibernate state, a sleep state, a shutdown state and a hard power off state.

19. The system as recited in claim 10 further comprising:

said thin client connected to said client blade, wherein said thin client comprises a memory for storing a computer program for generating acknowledgments in response to received keep-alive protocol messages.

20. The system as recited in claim 19, wherein said computer program of said thin client comprises the programming step of:

notifying a connection broker of a detected failure in receiving a keep-alive protocol message.

* * * * *